July 7, 1959
J. E. DAVIS
2,894,059
SCREEN GRID, COLOR BURST SEPARATION CIRCUIT
Filed Dec. 16, 1954
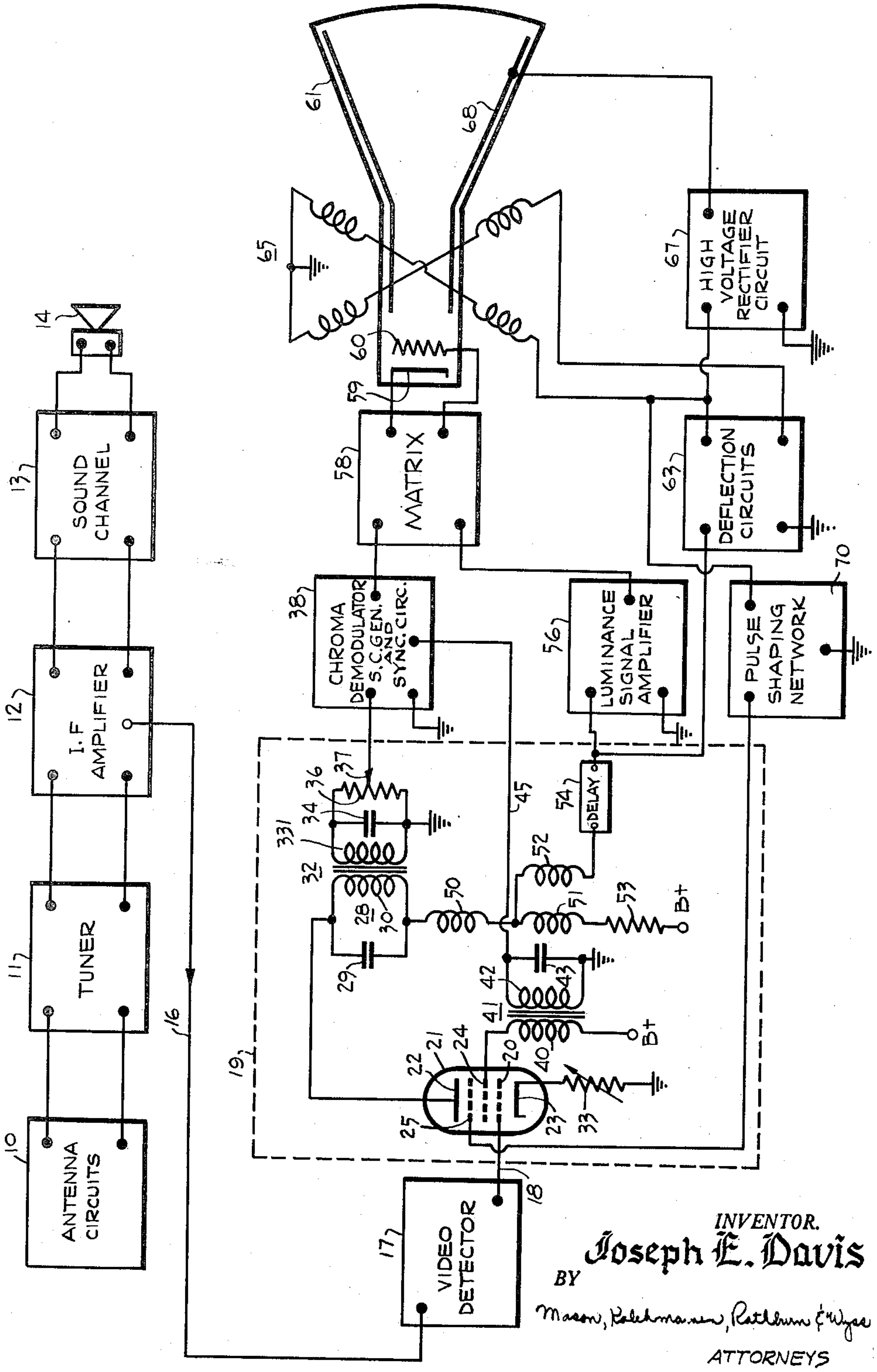
INVENTOR.
Joseph E. Davis
BY
Mason, Kolehmainen, Rathburn & Wyss
ATTORNEYS United States Patent Office 2,894,059

Patented July 7, 1959

2,894,059

SCREEN GRID, COLOR BURST SEPARATION CIRCUIT

Joseph E. Davis, Buffalo, N.Y., assignor, by mesne assignments, to Sylvania Electric Products Inc., Wilmington, Del., a corporation of Delaware Application December 16, 1954, Serial No. 475,641

3 Claims. (Cl. 178—5.4)

The present invention relates to color television receivers, more particularly to the luminance and chrominance signal amplifier portions of color television receivers; and the invention has for an object the provision of a new and improved luminance and chrominance signal amplifier arrangement which is simple in construction and inexpensive to manufacture.

In order to reproduce an image in simulation of its natural colors in accordance with present day techniques, a relatively large number of different information carrying signals must be received, distinguished and utilized. The received wave includes cathode ray sweep synchronizing signals, audio signals, luminance or video signals, color saturation and hue signals, and color subcarrier oscillator synchronizing signals (burst). In addition to distinguishing and separately utilizing these signals to control various portions of the receiver, it is also necessary to prevent certain ones of these signals from appearing in certain circuits which are intended to be responsive to others of these signals. For example, for quality performance, the luminance and chroma signals should not appear in the subcarrier oscillator synchronizing circuits, and the burst signals should not appear in the luminance and chroma channels. Furthermore, the luminance and chroma signals must be combined and matrixed in a predetermined manner, which is generally accomplished by matrixing the chroma signals before the addition thereof to the luminance signals.

Another object of the present invention is to provide a single amplifier for simultaneously amplifying the luminance and chroma signals.

Still another object of the present invention is to provide a new and improved amplifier arrangement for amplifying the chroma, video and burst signals, which amplifier utilizes a minimum number of circuit components.

A further object of the present invention is to provide a new and improved single amplifier and associated circuit for amplifying the chroma, video and burst signals, for rendering the chroma circuits inoperative during the reception of a burst signal, and also for preventing the chroma and video signals from appearing in the local subcarrier oscillator synchronizing circuits.

Briefly, in accordance with one aspect of the present invention, there is provided an amplifier having an input circuit including a control electrode and cathode on which is impressed an output signal from the second detector of the receiver. The signal thusly supplied to this amplifier is a combination wave including the luminance signal, the chrominance signal, the burst signal and the cathode ray synchronizing pulses. The amplified chroma, luminance and cathode ray synchronizing pulse signals appear at the anode of the amplifier and are separated by suitable filters for application to their various utilization circuits. A tank circuit tuned to the subcarrier frequency is loosely coupled to the screen electrode of the amplifier and is used to couple the burst pulse to the subcarrier synchronizing circuits by way of connection 45. A negative going gating pulse, conveniently derived from the horizontal deflection circuit, is supplied to the suppressor electrode of the amplifier during occurrence of the burst pulse so that the entire output from the amplifier appears at the screen electrode during the burst period and, consequently, is coupled to the subcarrier oscillator synchronizing circuits.

The invention, both as to its organization and method of operation, together with further objects and advantages thereof, will best be understood by reference to the following description taken in connection with the single figure of the accompanying drawing in which is shown a partial block diagram of a color television receiver embodying the amplifier circuit of the present invention.

Referring to the drawing, there is illustrated a color television receiver incorporating the amplification circuit of the present invention, with the standard components of the receiver being shown in block diagram form. The receiver includes a conventional antenna stage 10 adapted to receive and select a color television signal including a modulated carrier wave and an audio modulated carrier wave. These received carrier waves are applied to a conventional tuner or mixer stage 11 to reduce the received carrier waves to waves of intermediate frequency. These modulated intermediate frequency carrier waves appearing at the output of the tuner 11 are supplied to a conventional intermediate frequency amplifier 12 having at least two outputs, one of which is supplied to the conventional audio circuits contained in the sound channel 13 to drive a conventional loud speaker 14, and the other of which is the intermediate frequency carrier wave on which is modulated the chroma, luminance and synchronizing information. This intermediate frequency carrier wave, which is modulated by this composite signal, is coupled through a conductor 16 to a video detector circuit 17, wherein the modulated video intermediate carrier wave is detected to produce a composite output wave containing the video or luminance signal, the cathode ray sweep circuit synchronizing signal, the color burst signal and the modulated color subcarrier wave. This composite output wave is coupled through the conductor 18 to the amplification circuit of the present invention which is shown enclosed within the dotted lines 19. The circuits described thus far, with the exception of the amplifier 19, are conventional and are included merely by way of illustration to enable to clear understanding of the present invention.

The entire composite output wave from the video detector is applied to the control electrode 20 of a multigrid amplifier tube 21 also having an anode 22, a cathode 23, a screen electrode 24 and a suppressor electrode 25. In the absence of a negative bias on the suppressor grid 25, the amplified composite wave appears at the anode 22 and, consequently, across the tuned circuit 28 comprising a capacitor 29 and an inductor 30 which forms the primary winding of a transformer 32. A variable cathode resistor 33 is provided for control of the luminance signal.

To separate the chroma signal from the other information contained in the amplified wave appearing at the anode 22, the secondary winding 331 of the transformer 32 is tuned, by means of a capacitor 34 connected in parallel therewith, to approximately the frequency of the color subcarrier wave. The chroma modulated subcarrier wave thus appears across the potentiometer 36 which has the outer terminals thereof directly connected across the secondary winding 331 and the variable tap 37 thereon coupled to the input of the conventional chroma demodulator circuits 38. In the chroma circuits 38, the modulated subcarrier wave is detected in the conventional manner to produce the desired color difference signals.

Conventional chroma detector circuits include a crystal controlled local subcarrier oscillator which must be synchronized with the subcarrier oscillator at the transmitter. To effect this synchronization, there is provided in the transmitted wave following each horizontal synchronizing pulse a burst of approximately nine cycles of the subcarrier frequency which may conveniently be used at the receiver to synchronize the local subcarrier oscillator. By properly gating the discharge device 21 by means of a signal supplied to the suppressor grid 25 thereof, the entire output wave from the discharge device 21 may be made to appear at the screen electrode 24 during the period when the burst signal appears in the received wave. During this burst period, the amplified burst signal appears across the primary winding 40 of the transformer 41 which has a secondary winding 42 tuned by means of the capacitor 43 to substantially the frequency of the color subcarrier wave. The burst takeoff transformer presents a low impedance to the screen grid so that during those periods when the suppressor electrode is not negatively biased negligible screen grid degeneration is produced and a relatively small signal is coupled to the subcarrier synchronizing circuits. When, however, a negative gating pulse is applied to the suppressor 25, a considerably higher current (ten times as high) flows in the screen circuit and the burst signal is then effectively coupled to its utilization circuit.

In order to separate the chroma signal from the luminance and cathode ray synchronizing signals, the hereinbefore mentioned chroma coupling circuit including the tuned chroma transformer 32 is connected in the anode circuit, and a shunt series peaking circuit including the inductors 51 and 52 is also connected in the anode circuit. An isolating inductor 50 is interconnected between the peaking circuit and the chroma takeoff transformer 32. Since below the subcarrier frequency the transformer primary tuned circuit in inductive, it and the isolating inductor 50 are incorporated into the peaking circuit 51, 52 to provide a coupling circuit having the desired frequency transmission characteristic for the luminance signal. This peaking circuit is also designed to compensate for the dip in the amplifier band pass characteristic caused by the tuned chroma takeoff circuit. If desired, this compensation may be accomplished in a cascade luminance amplifier arrangement. For example, the luminance and cathode ray synchronizing signals may be coupled through a delay line 54 to a luminance amplifier 56 for further amplification and compensation.

The delay line 54 is provided to equalize the delay in the luminance channel with that in the chroma channel such that the signals from the output of the delay line 54 and the signals from the chroma circuits 38 are in proper phase relationship for application to the matrixing unit 58. The output of the matrix 58 may be conveniently coupled between the cathodes 59 and the control grids 60 of a conventional three gun color picture tube 61. The wave appearing at the output of delay line 54 also includes the cathode ray deflection synchronizing pulses which are applied to conventional deflection circuits 63 to provide sweep signals for driving a conventional magnetic sweep coil assembly 65. A high voltage rectifier 67 is energized by the circuit 63 and provides the accelerating voltage to the anode 68 of the tube 61.

In order to provide a negative going gate signal during the burst period, the horizontal sweep signal appearing at the output of the deflection circuit 63 is supplied to a conventional pulse shaping circuit 70 which produces a negative going pulse during the time when the burst signal appears in the composite wave supplied through conductor 18 to the control electrode 20 of the amplifying discharge device 21. During this period when the negative gate pulse is supplied to the suppressor electrode 25, the output of the discharge device 21 appears at the screen electrode 24 and no signal is present at the anode 22. In the absence of a negative gate pulse, the output terminal of the shaping circuit 70 is at ground potential such that the output signal appears at the anode 22. The operation of pentode gating circuits is well known in the art, and for the purposes of clarity is not described herein. It will be understood that the gating signal may be derived from signals appearing at points in the circuit other than at the horizontal deflection windings. For example, an auxiliary winding may be provided on the horizontal output transformer for this purpose, or the conventional horizontal AFC circuit can be designed to provide a gate pulse which is suitably phased for direct coupling to the suppressor electrode 25.

Having the various circuit components in mind, a better understanding of the present invention may be had from a description of the operation of the amplifying circuit 19 during one horizontal scanning cycle of the input wave supplied to the control electrode 20. Let it be assumed that the received wave at the instant time is varying in accordance with the picture information such that the output of the video detector contains a video wave varying in accordance with the overall luminance of the particular picture element being scanned, and a color subcarrier wave which is amplitude modulated in accordance with the saturation and phase modulated in accordance with the hue of the particular picture element being scanned. During this period, no negative gating pulse is supplied to the suppressor electrode 25 from gating circuit 70 and, consequently, the output of the discharge device 21 appears at the anode 22. The upper and lower side band components of color subcarrier signal are separated from the remainder of the composite output wave in the wide band (approximately two to four mc.) tuned circuits comprising the transformer 32. The amplitude of the chroma signal thus developed across the tuned circuit 33, 34 may be varied by adjustment of the potentiometer 37, and this chroma signal is supplied to the chroma demodulator circuit 38. The video signal appears across the resistor 53 and is coupled through the peaking circuit and the delay line 54 to the luminance circuit, wherein it is amplified and applied to the matrixing unit 58 for combination with the color difference signals to provide the desired red, blue and green color signals which are impressed upon the three electron guns of the picture tube 61.

It will be understood by those skilled in the art that synchronizing pulses do not appear in the received wave during that time when the color and luminance signals are received. Since the width of the burst pulse is constant, and, furthermore, since the spacing between the burst pulse and the horizontal synchronizing pulse is constant, it is convenient to trigger the gating circuit with a signal which has a constant predetermined time relationship with respect to the horizontal synchronizing pulses. Following the completion of one line of the picture on the face of the color picture tube 61, the received wave contains no picture information but does contain a horizontal synchronizing pulse. During this period of time when the horizontal synchronzing pulse is being received, there is still no negative gating signal supplied to the suppressor electrode 25, and, therefore, the amplified horizontal synchronizing pulse appears at the anode 22. The horizontal synchronizing signal, being effectively of a low frequency as compared to the color subcarrier, is coupled through the peaking circuit and the delay line 54 to the cathode ray deflection circuit 63 wherein the sweep signals produced thereby are synchronized in accordance with the received synchronizing pulses.

In the embodiment shown, a portion of the horizontal sweep signal is coupled to the shaping circuit 70 to provide a negative going gate during the burst period. Since, therefore, the negative going gate on the suppressor electrode 25 coincides in time with the burst signal and is approximately of the same width, the output of the discharge device 21 effectively appears on the screen grid 24 when and only when the burst signal is present in the received wave. During this period there is no amplified signal output at the anode 22, and, therefore, the burst signal does not appear in the chroma circuits 38. There is, therefore, little chance that noise and other disturbances appearing in the received wave will affect the frequency or phase of oscillation of the local subcarrier oscillator.

It may thus be seen that the present invention provides a relatively simple and, consequently, inexpensive yet highly efficient circuit for amplifying the video signal, the chroma signal, the burst signal and the deflection synchronizing pulses. Furthermore, this same circuit provides the features of burst killing and burst amplification.

While there has been described what is at present considered to be the preferred embodiment of the invention, it will be understood that various modifications may be made therein which are within the true spirit and scope of the invention as defined in the appended claims.

What is claimed and desired to be obtained by Letters Patent of the United States is:

1. In a color television receiver, a control device having an anode electrode, a cathode electrode, a control electrode, a screen electrode and a suppressor electrode; means for applying composite electrical impulses, having luminance, chrominance, synchronizing and burst components, to said control and cathode electrodes; a tuned circuit, tuned to said chrominance component, coupled to said anode electrode; a source of anode potential; a resistance; a coil connected in series with said resistance, said series connected coil and resistance being connected to and between said source of anode potential and said tuned circuit; a chroma demodulator coupled to said tuned circuit; a cathode ray color tube; beam deflection circuits, coupled to said coil, for deflecting the electron beam of said cathode ray color tube; means for deriving negative gating pulses from said deflection circuits; means for applying the negative gating pulses derived from said deflection circuits to said suppressor electrode; a burst transformer coupled to said screen grid; a subcarrier synchronizing circuit connected with said chroma demodulator; means coupling said burst transformer to said subcarrier synchronizing circuit; a luminance amplifier coupled to said coil; and means for varying the electron beam of said cathode ray tube with electrical pulses derived from said chroma demodulator and said luminance amplifier.

2. In a color television receiver having a subcarrier generator, a subcarrier synchronizing circuit therefor, a chroma demodulator utilizing waves generated by said subcarrier generator, a luminance signal amplifier, a cathode ray tube, electron beam deflection circuits for the cathode ray tube and means to vary the electron beam within the cathode ray tube in accordance with electrical impulses derived from the luminance amplifier and chroma demodulating circuit; the improvement which includes an amplifier having cathode, control grid, screen grid, suppressor grid and anode electrodes; means to apply to the control grid and cathode electrodes of said amplifier, color television impulses having chroma, luminance, synchronizing and burst components; a tuned circuit, tuned to the chroma components, coupling the anode electrode of said amplifier to the chroma demodulator; a tuned circuit, tuned to the frequency of the burst components, coupling the screen grid electrode of said amplifier to said subcarrier synchronizing circuit; means for deriving gating impulses from said deflection circuits; means to apply the gating impulses to the suppressor grid electrode of said amplifier; a source of anode potential; a coil connected between said source and the tuned circuit coupling the anode to said chroma demodulator; means coupling said coil to said luminance amplifier and means coupling said coil to said beam deflection circuits.

3. In a color television receiver, a tube having an anode, a cathode, a control grid, a suppressor grid and a screen grid; means applying composite electrical impulses having chroma, luminance burst and synchronizing components, to the control grid and cathode of said tube; a tuned circuit, tuned to chroma components connected to said anode; a chroma subcarrier generator, a chroma demodulator coupled to said tuned chroma circuit and to said subcarrier generator; a source of anode potential; a peaking circuit connected between said tuned circuit and said source of anode potential; a luminance amplifier coupled to said peaking circuit; a circuit, tuned to the frequency of said burst signal components, connected to said screen grid; means to produce negative voltage pulses synchronized with, and under the control of pulses derived from said peaking circuit, during intervals when burst signals occur; means to subject said suppressor grid to said synchronized negative voltage pulses; a color cathode ray tube; means to operate said tube under control of electrical pulses derived from chroma demodulator and from said luminance amplifier; a chroma subcarrier synchronizing circuit and means coupling the tuned circuit connected to said screen grid, to said subcarrier synchronizing circuit; said subcarrier synchronizing circuit being coupled to said subcarrier generator.

References Cited in the file of this patent

UNITED STATES PATENTS

| | | |
|---|---|---|
| 2,236,066 | Poch | Mar. 25, 1941 |
| 2,275,016 | Koch | Mar. 3, 1942 |
| 2,289,291 | Moore | July 7, 1942 |
| 2,713,608 | Sonnenfeldt | July 1, 1953 |
| 2,743,311 | Richman | Apr. 24, 1956 |